(12) United States Patent
Seipel

(10) Patent No.: US 10,919,386 B2
(45) Date of Patent: Feb. 16, 2021

(54) BEARING ARRANGEMENT

(71) Applicant: Henniges Automotive GmbH & Co. KG, Rehburg-Loccum (DE)

(72) Inventor: Petric Seipel, Wunstorf (DE)

(73) Assignee: Henniges Automotive GmbH & Co. KG, Rehburg-Loccum (DE)

( * ) Notice: Subject to any disclaimer, the term of this patent is extended or adjusted under 35 U.S.C. 154(b) by 0 days.

(21) Appl. No.: 15/982,387

(22) Filed: May 17, 2018

(65) Prior Publication Data

US 2018/0334030 A1 Nov. 22, 2018

(30) Foreign Application Priority Data

May 18, 2017 (DE) .................. 10 2017 110 874

(51) Int. Cl.
*F16C 27/06* (2006.01)
*B60K 17/24* (2006.01)
*F16F 1/38* (2006.01)

(52) U.S. Cl.
CPC ............ *B60K 17/24* (2013.01); *F16C 27/066* (2013.01); *F16F 1/3842* (2013.01); *F16C 2326/06* (2013.01)

(58) Field of Classification Search
CPC ..... F16C 27/066; F16C 2326/06; B60K 17/24
See application file for complete search history.

(56) References Cited

U.S. PATENT DOCUMENTS

| | | | | |
|---|---|---|---|---|
| 3,639,015 A | * | 2/1972 | Maas | B60K 17/24 384/536 |
| 5,145,025 A | * | 9/1992 | Damian | F16C 27/066 180/381 |
| 5,314,255 A | * | 5/1994 | Schwerdt | B60K 17/24 384/215 |
| 6,869,225 B2 | * | 3/2005 | Tatsumura | F16C 27/066 384/536 |
| 6,948,857 B2 | * | 9/2005 | Schuetz | F16C 23/084 384/498 |
| 7,922,394 B2 | * | 4/2011 | Hirakawa | B60K 17/22 180/381 |
| 8,888,376 B2 | * | 11/2014 | Hatogai | F16C 3/02 384/480 |
| 8,961,024 B2 | * | 2/2015 | Ikeda | F16C 27/066 384/536 |
| 10,132,357 B2 | * | 11/2018 | Kawarada | F16C 3/02 |
| 2008/0095484 A1 | * | 4/2008 | Wirges | F16C 27/066 384/536 |
| 2011/0133413 A1 | * | 6/2011 | Kato | F16C 33/76 277/565 |
| 2013/0287330 A1 | | 10/2013 | Ikeda | |

FOREIGN PATENT DOCUMENTS

DE 102014011414 * 2/2016

* cited by examiner

*Primary Examiner* — James Pilkington
(74) *Attorney, Agent, or Firm* — Howard & Howard Attorneys PLLC

(57) ABSTRACT

A bearing arrangement, which is provided for installation into a bearing carrier (1), has at least one pivot bearing (2) as well as at least one elastomer collar holding the pivot bearing (2), which has at least one friction-connection surface (5) formed in the for holding within the bearing carrier (1). An elastomer collar (4) has at least one elastomer fold (6), over the course of which the collar material has at least one stiffness weakening (7). The stiffness weakening (7) either features a reduction of material strength or an increase in elasticity.

7 Claims, 3 Drawing Sheets

BEARING ARRANGEMENT

BACKGROUND

The invention relates to a bearing arrangement for installation into a bearing carrier with at least one pivot bearing and at least one elastomer collar holding the pivot bearing.

SUMMARY

In particular, such bearing arrangements including cardan-shaft centre bearings or cardan-shaft intermediate bearings used for vibration dampening in the field of automotive engineering, the elastomer bearings of which act as vibration dampers for drive shafts. So-called insert technology is known for reliably holding the elastomer collar in a bearing carrier during operation, where the elastomer collar, by means of pressing forming, joining or over-moulding the clamp or the connection rings, becomes a permanent and non-detachable component of the assembly, the insert, thereby being held within the bearing carrier. Overall, the production of such bearing arrangements is complex since the pressing require strict tolerances to be met, the forming thereof requires the use of expensive flanging tools, joining requires the use of additional securing elements and over-moulding requires the use of expensive injection-moulding tools.

Therefore, the object of the invention is to indicated a bearing arrangement of the aforementioned class, the production of which is possible based on an especially simple and short sequence of operations.

According to the invention, the task is achieved by means of a bearing arrangement with the features of Patent claim 1. Favourable further embodiments of the invention are indicated in the subclaims.

The bearing arrangement according to the invention is characterized in that the elastomer collar has at least one friction-connection surface formed for holding within the bearing carrier and that the elastomer collar has at least one elastomer fold, via the course of which the collar material has at least one stiffness weakening. Thereby, at least one axial force introduced into the bearing carrier via the pivot bearing results in the elastic deformation of the elastomer collar and thereby to a continuous change of the course of the fold. Since the stiffness weakening is formed across the course of the fold of the collar material, each change of the course of the fold leads to an elastic deformation and thereby to a deformation resistance, which sets the elastomer collar against a bearing carrier across its friction-connection surface. Consequently, the actual force introduced into the bearing arrangement results in an increase of the normal forces acting on the friction-connection surface and therefore in a strengthening of a traction established between the elastomer collar and the bearing carrier. With the strengthening of the traction, the bearing arrangement according to the invention has a type of self-inhibitor, by means of which it is safeguarded against at least one movement going out of a bearing carrier in the axial direction.

Favourably, additional components such as outer rings, retaining rings or additional work processes such as flanging or injection moulding can be done without. A work sequence required for the installation of the bearing arrangement according to the invention is limited to a simple insertion movement, by means of which the bearing arrangement preferably designed as an insert is installed within a bearing carrier.

According to a first further embodiment of the invention, the stiffness weakening features at least a reduction of the material thickness in the collar material. In order to set various material thicknesses, for example, a constructive adaptation of the injection-moulding tool is required so that the elastomer collar manufactured using this injection-moulding tool has a material thickness that varies across the course of the fold of its elastomer collar.

As an alternative to the material thickness reduction, the thickness weakening can be established by at least increasing the elasticity of the collar material. In order to set various elasticities, for example, a material composition or material quality, which varies across the course of the fold of the elastomer fold. An increase of elasticity is preferably implemented via a corresponding modification of a elastomer casting compound suitable for manufacturing the elastomer collar.

According to a next further embodiment of the invention, an insert is formed with the pivot bearing and the elastomer collar. In order to form such an insert, the pivot bearing including a bearing cage also holding the pivot bearing is inserted into a vulcanization mould, in which it is over-moulded with a elastomer casting compound vulcanizing a elastomer collar.

In order to limit the radial movements of the pivot bearing, the elastomer collar has at least one radial end-stop formed with the collar material. This preferably has an end-stop buffer lying on the pivot bearing or its bearing cage on the one side of the elastomer fold, as well as a counter-buffer lying in the area of the friction-connection surface on the opposite side of the elastomer fold.

According to another further embodiment of the invention, the elastomer collar has at least one axial end-stop formed with the collar material to limit at least an axial movement of the pivot bearing. The axial end-stop has an end-stop surface orientated transversely to the fit surfaces, which are suitable for a one-sided end-stop on a bearing carrier holding the bearing arrangement. Securing the bearing arrangement in the end-stop position established with a bearing carrier only occurs by strengthening the traction if an axial force is applied to the bearing arrangement, with which it is moved out of the end-stop position. However, in principle, it is within the scope of the invention if an axial end-stop is done without and the pivot bearing is held in two elastomer collars with opposing effective direction and the bearing arrangement is secured in both axial directions by strengthening the traction established between the elastomer collar and the bearing carrier.

BRIEF DESCRIPTION OF THE DRAWINGS

It is furthermore conceivable if the elastomer collar is designed with a double effect, for example, with two elastomer folds separated from each other via a chamber.

An exemplary embodiment of the invention, from which other inventive features result, is shown in the drawing. The figures show.

DETAILED DESCRIPTION

Figure 1:
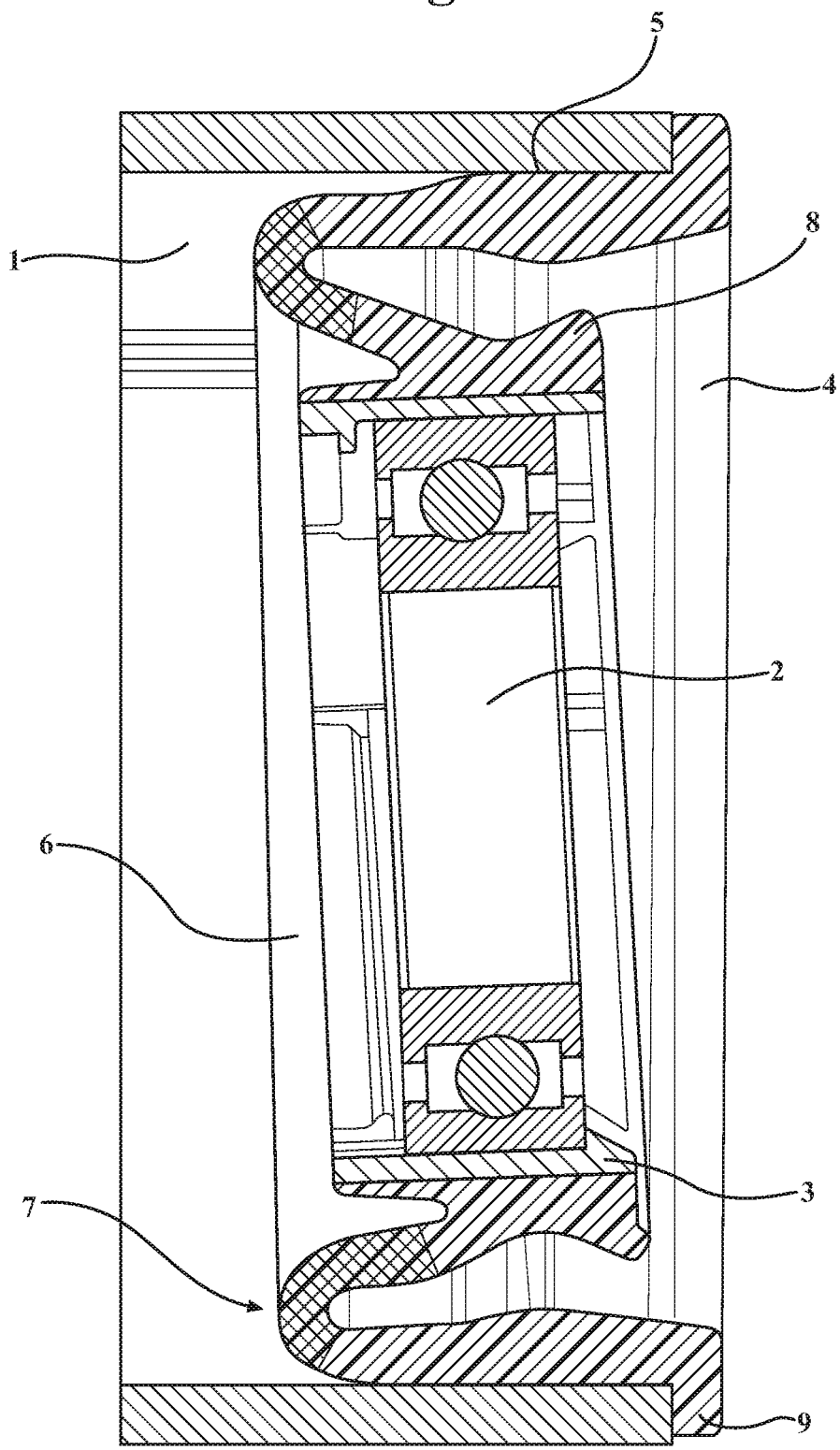
FIG. 1: a bearing arrangement according to the invention in a cross section

FIG. 1 sows a bearing arrangement according to the arrangement, which is installed into a bearing carrier 1. The bearing arrangement comprises a pivot bearing 2, a bearing cage 3 holding the pivot bearing 2, as well as an elastomer collar 4 holding the pivot bearing 2 along with the bearing cage 3. The elastomer collar 4 has a friction-connection surface 5 for holding within a bearing carrier 1 and an elastomer fold 6, via which the collar material has a stiffness weakening 7 (finely hatched area) across the course of its fold. The stiffness weakening 7 is established by reducing the material strength in the collar material of the elastomer collar 4. An insert if formed by means of the pivot bearing 2, the bearing cage 3 and the elastomer collar 4, where the collar cage 3 is overmoulded with the collar material of the elastomer collar 4. By means of a shape change generated on the bearing cage 3 during the injection-moulding process, the pivot bearing 2 is ultimately clamped within the collar cage 3. The elastomer collar 4 furthermore has a radial end-stop 8 formed with its collar material to limit radial movements of the pivot bearing 2. On the contrary, the elastomer collar 4 has an axial end-stop 9 formed with its collar material in order to limit an axial movement of the pivot bearing 2.

Figure 2:
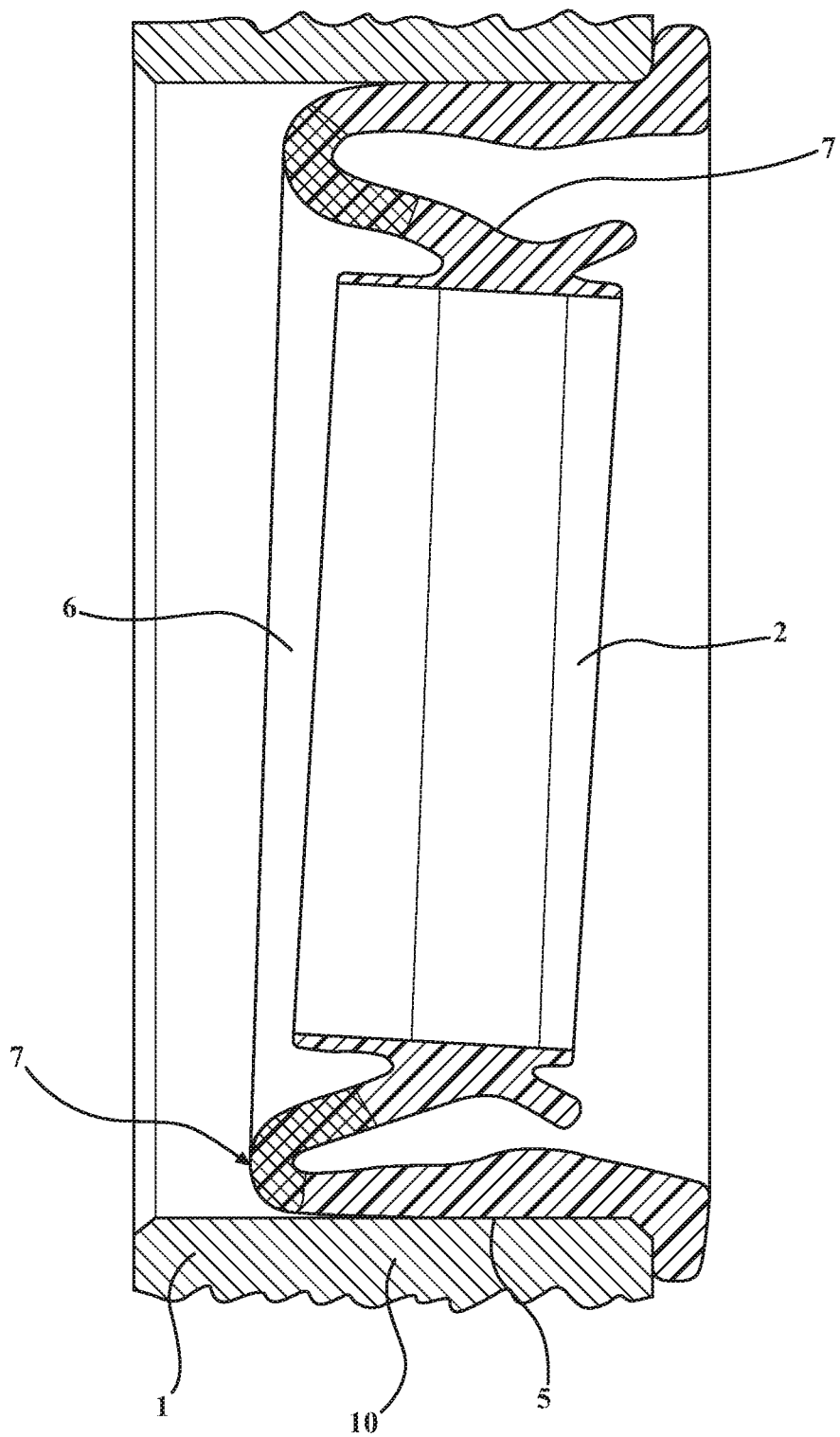
FIG. 2: a schematic sketch of the bearing arrangement in an unloaded state.
Figure 3:
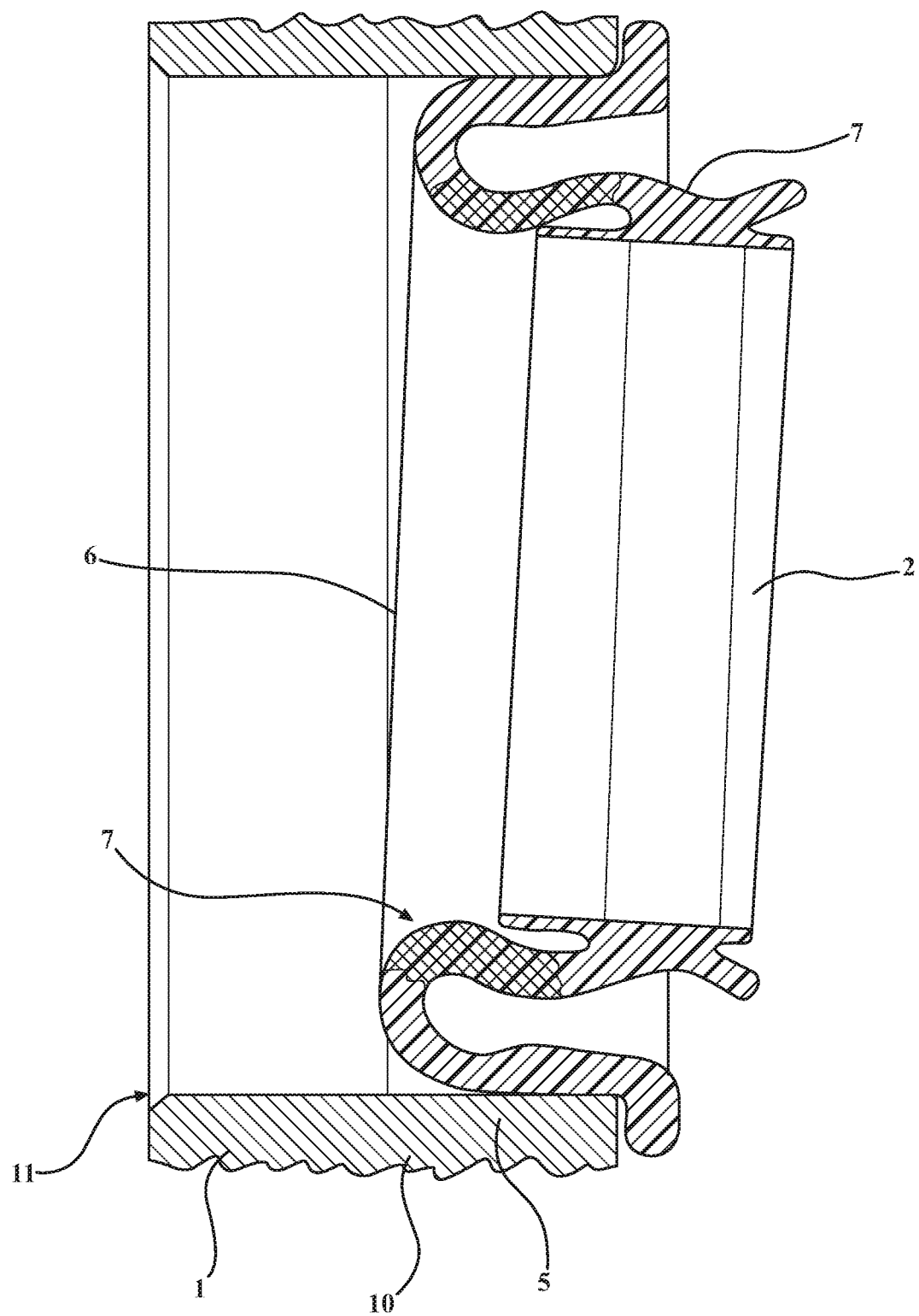
FIG. 3: a schematic sketch of the bearing arrangement according to the invention in a state loaded in an axial direction.

FIG. 2 shows a schematic sketch of a bearing arrangement in accordance with FIG. 1 in an unloaded state. In this state, the stiffness weakening 7, which is shown by a hatched area, is positioned in an direct transition area of the elastomer fold 6. A simple traction connection 10 is established with the normal forces acting between the friction-connection surface 5 and the bearing carrier 1. FIG. 3 shows a schematic sketch of the bearing arrangement in accordance with FIG. 1 In this state, the stiffness weakening 7, which is represented by a hatched area, a piece is moved out of the transition area of the elastomer fold 6 inwardly in a radial direction.

All features mentioned in the preceding description and in the claims can be combined in any selected form with the features of the independent claim. Thereby, the disclosure of the invention is not limited to the described and claimed feature combinations, rather all material combinations reasonable within the scope of the invention are to be deemed to be disclosed. Identical elements are provided with the same reference numbers.

The invention claimed is:

1. A bearing arrangement for installation into a bearing carrier with said bearing arrangement comprising:
   at least one pivot bearing; and
   at least one elastomer collar holding the pivot bearing;
   wherein the elastomer collar has an exterior contact surface forming a friction-connection for holding the elastomer collar in the bearing carrier;
   wherein the elastomer collar has at least one elastomer fold, which a material of the collar has at least one stiffness weakening across the course of the elastomer fold, with the stiffness weakening established by reducing a material thickness in the material of the collar; and
   wherein deformation of the elastomer collar increases normal forces acting upon the exterior contact surface to increase the friction-connection holding the elastomer collar in the bearing carrier;
   wherein the exterior contact surface holding the elastomer collar in the bearing carrier when the elastomer collar is in a first position is different than the exterior contact surface holding the elastomer collar in the bearing carrier during deformation of the elastomer collar.

2. The bearing arrangement according to claim 1, wherein the stiffness weakening increases elasticity of the collar.

3. The bearing arrangement according to claim 1, wherein the pivot bearing and the elastomer collar form an insert.

4. The bearing arrangement according to claim 1, wherein the elastomer collar has at least one radial end-stop formed with the material of the collar to limit radial movements of the pivot bearing.

5. The bearing arrangement according to claim 1, wherein the elastomer collar has at least one axial end-stop formed with the material of the collar to limit at least one axial movement of the pivot bearing.

6. The bearing arrangement according to claim 5, wherein the exterior contact surface forming the friction-connection is disposed between the axial end-stop and the elastomer fold.

7. The bearing arrangement according to claim 1, wherein the exterior contact surface forming the friction-connection is spaced from the elastomer fold.

\* \* \* \* \*